US007471017B2

(12) United States Patent
Chen

(10) Patent No.: US 7,471,017 B2
(45) Date of Patent: Dec. 30, 2008

(54) PAPER-BREAKER TOUCHING SAFETY PROTECTOR

(75) Inventor: Liangneng Chen, Shanghai (CN)

(73) Assignee: Aurora Office Equipment Co., Ltd. Shanghai, Shanghai (CN)

( * ) Notice: Subject to any disclaimer, the term of this patent is extended or adjusted under 35 U.S.C. 154(b) by 0 days.

(21) Appl. No.: 11/468,651

(22) Filed: Aug. 30, 2006

(65) Prior Publication Data

US 2008/0048504 A1 Feb. 28, 2008

(30) Foreign Application Priority Data

Jul. 14, 2006 (CN) .................... 2006 2 0043955 U

(51) Int. Cl.
*H02H 11/00* (2006.01)

(52) U.S. Cl. ...................................................... 307/326

(58) Field of Classification Search ................. 307/326; 241/37.5; 83/362, 365; 271/3.15, 3.17, 3.14

See application file for complete search history.

(56) References Cited

U.S. PATENT DOCUMENTS 3,919,596 A * 11/1975 Bellis ......................... 315/294
4,380,721 A * 4/1983 Bullock et al. .............. 315/362
7,195,185 B2 * 3/2007 Matlin ......................... 241/36

* cited by examiner

*Primary Examiner*—Stephen W Jackson
*Assistant Examiner*—Carlos Amaya
(74) *Attorney, Agent, or Firm*—David W. Carstens; Carstens & Cahoon, LLP

(57) ABSTRACT

The present invention relates to a paper-breaker touching safety protector, of which the control circuit unit is connected with the paper-breaking machinery part via the motor driving circuit unit, the control circuit unit is connected with the conductive touch panel via the touch detecting circuit unit, the power unit is connected respectively with the control circuit unit and motor driving circuit unit, wherein the touch detecting circuit unit includes a bio-voltage control switch circuit and a ground switch circuit, the input control terminal of said bio-voltage control switch circuit is connected with the conductive touch panel, the output terminal of control switch circuit is connected with the input control terminal of the ground switch circuit, the output terminal of the ground switch circuit is connected with the input control terminal of the control circuit unit. The paper-breaker touching safety protector with this structure could effect a protective rule from the accident harm and a real-time monitor; the controlling is safe and sensitive with a simple circuit structure and reliable operation performance, it functions a convenient manipulation and wide usability with the safety.

13 Claims, 5 Drawing Sheets

PAPER-BREAKER TOUCHING SAFETY PROTECTOR

CROSS-REFERENCE TO RELATED APPLICATION

This application claims priority benefits of Chinese Patent Application Number 200620043955.6, filed Jul. 14, 2006.

TECHNOLOGY FIELD

The present invention relates to office equipment field, especially relates to the office paper-breaker safety control technology, and relates to a paper-breaker touching safety protector in detail.

BACKGROUND TECHNOLOGY

The various office automation equipments get more and more prevalent in modern life, the most common of which is the paper-breaker that servers for the paper breaking and thus the commercial confidence security. The paper-breaker has been used in family at present, the general paper-breaker is under the auto-inductive state when power-on or before the power-off, the paper-entry port is operated automatically if a certain object is to be detected and rolls in the object with a following breaking, in view of, however, the paper-breaker is a grind machinery with a certain danger related to its paper-breaking machinery part, the accident may be happened in case of carelessness operation, and the prior paper-breaker has no protection unit at the paper-entry port to protect foreign object and even human-body from enter into, should this occur, the paper-breaker may be damaged and even resulted with a human-body injury, it could not prevent the children or pets from operating the apparatus causally and thus bring about a safety problem for people.

A paper-breaker with human-body touch detecting function has been developed at present, refer to FIG. 1, each unit's function as follows:

- The SW2 is a polarity transfer switch, the live wire and ground line of electric supply power could be interchanged with it.
- The resistor R12, R13, capacitors C3, C2, diodes D11, D12, D13, D14, D15, D6 constitute the relay power (24V) circuit.
- The diodes D6, D7 and capacitor C1 consist of the power circuit of the voltage detecting chip U1. Wherein, the positive pole of the power is the live wire of the electric supply.
- The relay switch RLY-1, diode D2, triode Q1, resistors R5, R27, R6 and optical coupler U5 constitute an apparatus operation power supply circuit.
- The diodes D1, D8, D21, temperature control indicating light (orange), triode Q4, resistors R4, R14, R11 and motor temperature control switch constitute a temperature control indicating circuit.
- The fuse F1, switch RLY1, motor, functional switch and motor temperature control switch constitute a motor operation circuit, the motor run direction corresponds to the functional switch position.
- The power, resistors R7, R1, R9, R2, R8, R10, diodes D20, D16, D4, D5, D9, D10, triodes Q2, Q3, fifth leg of the voltage detecting chip U1 constitute a LED light indication circuit.
- The panel metal part, resistors R20, R19, R21, R22, capacitor C8 and diodes D19, D17 constitute a touching detecting circuit.

In case of the functional switch to be at the non-close position, the drum is separated from the apparatus, the magnetic-spring switch is turned off, the first leg of the voltage detecting chip U1 detects out a signal of the magnetic-spring switch off, the fifth leg of the voltage detecting chip U1 would turn out a high level, and the Q3, Q2 would be turned off. The Power indicating light, R7, touch indicating light, R8, D9 and motor temperature control switch from a loop. The power indicating light and touch indicating light would be switched on. The sixth leg of U1 turns out a high level at the same time, the triode doesn't work in cause of no base electrode positive voltage and the apparatus doesn't operate. In case of the drum is integral with the apparatus (i.e. the magnetic-spring switch is closed), the fifth leg of the U1 has a low level, the Q3, Q2 are on, the power indicating light is on, and the sixth leg of the U1 has a low level, the Q1 is on. The relay is closed. In case of the functional switch is at the reverse run position, the apparatus would run in reverse direction. In case of the functional switch is at the paper-breaking position, the apparatus would break the paper (paper entry signal is on), and the apparatus is in the stand-by state (paper entry signal is off). In case of the apparatus is in the operation state, if the hand, metal part or animal contacts with the metal part of the apparatus' upper cover, a loop would be formed through the human-body or metal via the R21, R19, R20 by the electric supply, the eighth leg of the U1 has a low level, and the fifth & sixth leg of U1 has a high level.

- In case of the sixth length of U1 has a high level, the Q1 would be off, the power is switched off, and the motor is stopped.
- In case of the fifth leg of U1 has a high level, the Q2 and Q3 are off, and the touch protective indicating light (orange) is on.
- When the hand, metal part or animal is separated from the metal part of the apparatus' upper cover, the apparatus would resume normal at once.

In case of the functional switch is at the closed position, the apparatus doesn't work.

Owing to the fact that the conductive touch panel is installed at the paper-entry port of the paper-breaker, and the circuit is controlled by the conductance from human-body to the AC (electric supply) to achieve a touching protection purpose, and owing to the fact that electric supply is run through two 2.2MΩ resistors, the human-body-through current would be reduced without a human-body harm. The sensitive voltage detecting IC unit, however, be necessary to real-time monitor the state of the conductive touch panel, and the higher stability and sensitivity of the IC unit are thus needed, an elongated usage and aged circuit would result a weakened detecting function; although two large resistors are to be applied to limit the current, under the humidity condition, however, the resistors wouldn't have the protection ability, and the human-body may contact directly with the live wire of electric supply to result a shock or even danger to vitals.

DISCLOSURE OF THE INVENTION

The present invention overcomes the shortcomings of prior technology to provide a paper-breaker touching safety protector that could effect a real-time monitor through the human-body bio-current, the controlling is safe and sensitive with a simple circuit structure and reliable operation performance, it functions a wide usability with the safety.

To achieve the purpose above, the paper-breaker touching safety protector according to the present invention has the following constitution:

A paper-breaker touching safety protector, including the paper-breaking machinery part, functional circuit and conductive touch panel located at the paper-entry port of the paper-breaker, said functional circuit includes power unit, motor driving circuit unit, control circuit unit and touch detecting circuit unit, said control circuit unit is connected with the paper-breaking machinery part via the motor driving circuit unit, and the control circuit unit is connected with the conductive touch panel via the touch detecting circuit unit, said power unit is connected respectively with the said control circuit unit and motor driving circuit unit, basically characterized in that said touch detecting circuit unit includes a bio-voltage control switch circuit and a ground switch circuit, the input control terminal of said bio-voltage control switch circuit is connected with said conductive touch panel, said ground switch circuit is a switch transistor circuit, said ground switch circuit includes the second switch triode, the base electrode of the second switch triode is connected with the output terminal of said bio-voltage control switch circuit, the emitter of the second switch triode is grounded, and its collector is connected with the power via the fourth resistor, and the collector is connected with the input control terminal of said control circuit unit via an optical coupler.

The bio-voltage control switch circuit according to the paper-breaker touching safety protector is a switch transistor circuit.

The bio-voltage control switch circuit according to the paper-breaker touching safety protector includes a first switch triode, the base electrode of the first switch triode is connected with said conductive touch panel via a first resistor, and the base electrode is grounded via a second resistor that paralleled with a first capacitor, and the collector of the first switch triode is connected with the power, its emitter is grounded via a third resistor that paralleled with a second capacitor, and the emitter is connected with the input control terminal of the ground switch circuit.

The collector of the first switch triode according to the paper-breaker touching safety protector is connected with the power via the paralleled power indication LED and the touch indication LED.

The control circuit unit according to the paper-breaker touching safety protector is connected further with a paper-entry detecting circuit unit, said paper-entry detecting circuit unit includes a LED and a light dependent diode, the light-emission part of the said LED is correspondent with the light-sensitive part of the light dependent diode, and are respectively located on the opposite side wall of the paper-entry passage of the paper-breaker.

The control circuit unit according to the paper-breaker touching safety protector is connected further with an over-load protective circuit unit, said over-load protection circuit unit includes a sampling resistor, a constant-voltage diode, a fifth capacitor and a thyristor, said thyristor is connected between the input control terminal of said control circuit unit and the ground, said constant-voltage diode and the fifth capacitor is connected between the electric current output terminal of said motor driving circuit unit and the ground in series, said sampling resistor (R14) is also connected between the electric current output terminal of said motor driving circuit unit and the ground, the trigger electrode of said thyristor is connected between said constant-voltage diode and the fifth capacitor.

According to the paper-breaker touching safety protector, a diode is connected between the electric current output terminal of said motor driving circuit unit and said constant-voltage diode.

According to the paper-breaker touching safety protector, a fifth resistor is connected between said diode and said constant-voltage diode.

According to the paper-breaker touching safety protector, a fifth resistor is connected between the fifth capacitor and said constant-voltage diode.

According to the paper-breaker touching safety protector, a sixth resistor is connected between the trigger electrode of said thyristor and the ground.

The control unit according to the paper-breaker touching safety protector is connected further with a motor reverse-run detecting circuit unit.

The power unit according to the paper-breaker touching safety protector includes the power interface circuit, safety switch, fuse, control switch, power circuit for control circuit and paper-breaking functional switch, said power interface circuit is connected with said motor driving circuit unit via respectively the safety switch, fuse, control switch and paper-breaking functional switch, said fuse is connected with said control circuit unit via the power circuit for control circuit.

The control switch according to the paper-breaker touching safety protector is a relay switch.

In view of the paper-breaker touching safety protector according to the present invention, owing to the fact that the serial bio-voltage control switch circuit and ground switch circuit are to be applied, the input control terminal of the bio-voltage control switch circuit is connected with the conductive touch panel at the paper-entry port of the paper-breaker, the output terminal of the control switch circuit is connected with the input control terminal of said ground switch circuit, the output terminal of the ground switch circuit is connected with the input control terminal of the said control circuit unit, in case of human-body contacts with the conductive touch panel, both the bio-voltage control switch circuit and ground switch circuit are conductive by the human-body bio-current to stop the control circuit unit, even though the power switch is turned on, the paper-breaking machinery part wouldn't work, and it could effect a protective rule from the accident harm to human body and a real-time monitor; and the whole controlling is safe and sensitive with a simple circuit structure and reliable operation performance, it functions a convenient manipulation and wide usability with the safety.

PREFERRED EMBODIMENTS OF THE INVENTION

In order to explain the present invention in greater detail, the preferred embodiments will be described below with reference to the accompanying figures.

Figure 1:
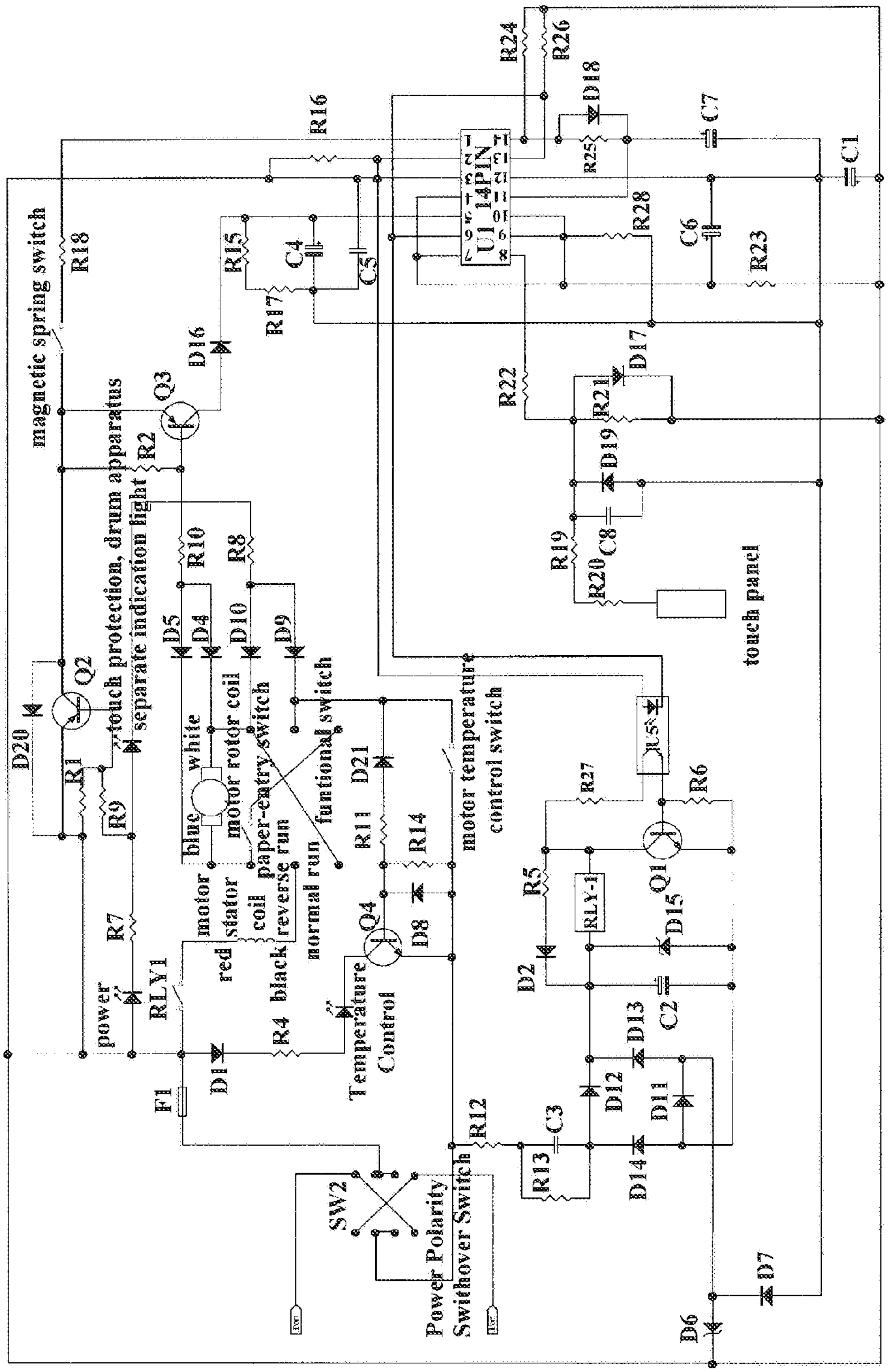
Prior Art Figure 1
FIG. 1 is a circuit principle diagram showing the function of the paper-breaker in prior art.
Figure 2:
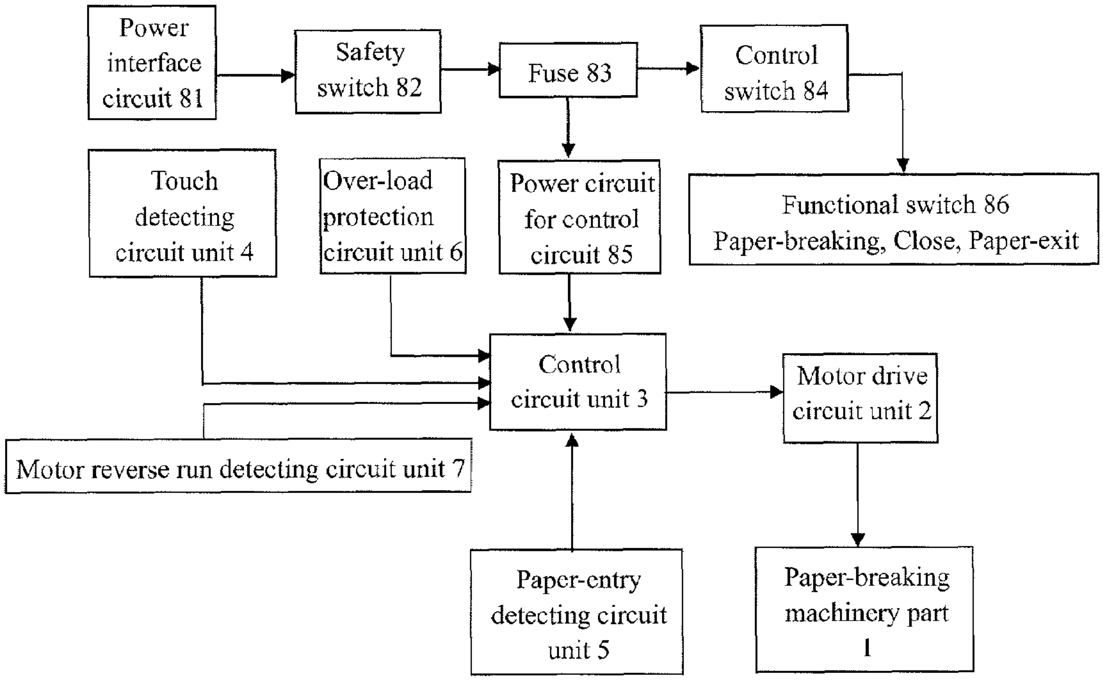
FIG. 2 is a functional module sketch map showing the structure of paper-breaker touching safety protector according to the present invention.
Figure 3:
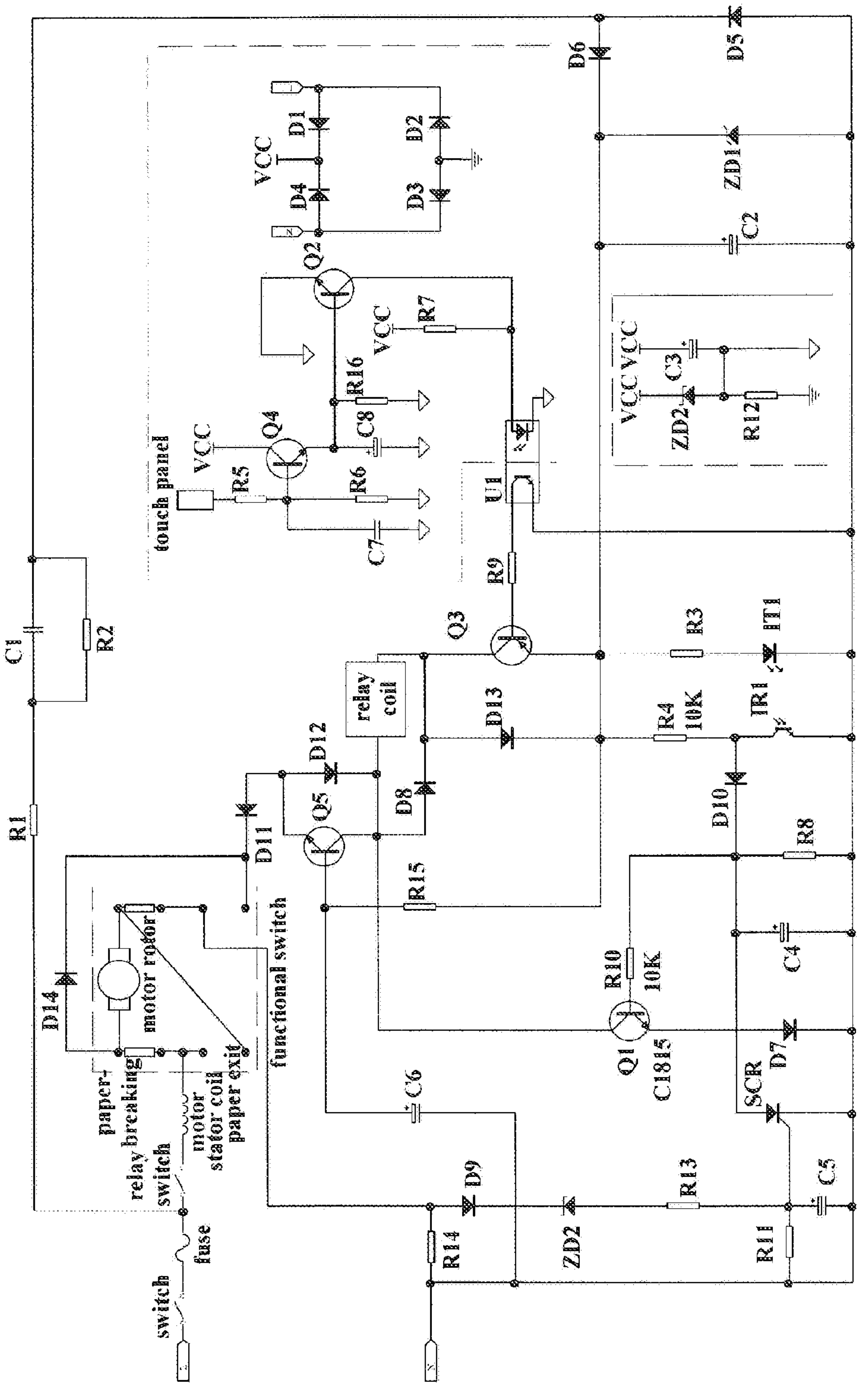
FIG. 3 is a circuit principle diagram showing paper-breaking touching safety protector in accordance with the first embodiment of the present invention.
Figure 4:
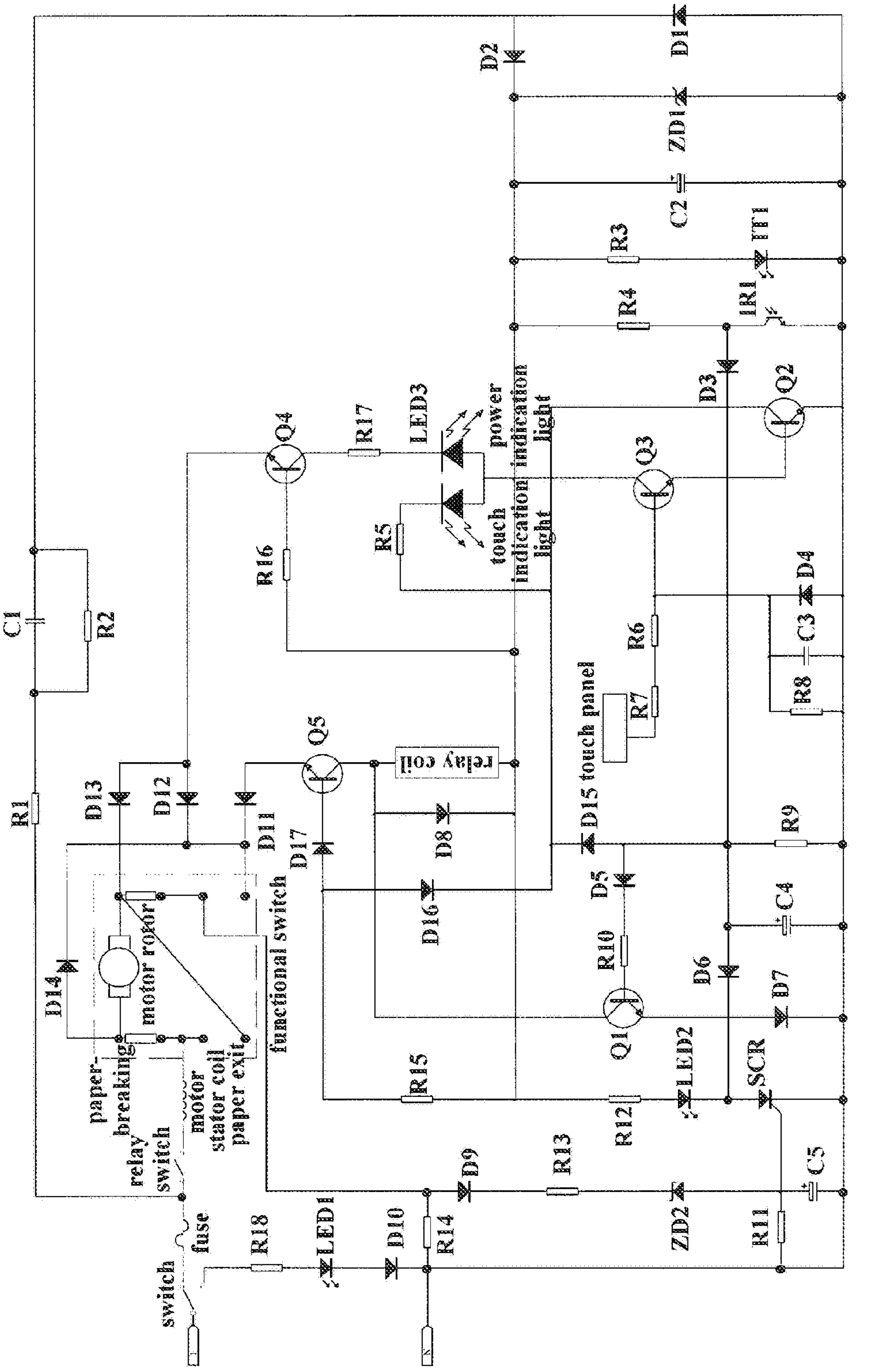
FIG. 4 is a circuit principle diagram showing paper-breaker touching safety protector in accordance with the second embodiment of the present invention.

Refer to FIG. 2 to FIG. 4, the paper-breaker touching safety protector includes paper-breaking machinery part 1, functional circuit and conductive touch panel located at the paper-entry port of the paper-breaker, said functional circuit includes power unit, motor driving circuit unit 2, control circuit unit 3 and touch detecting circuit unit 4, said control circuit unit 3 is connected with the paper-breaking machinery part 1 via the motor driving circuit unit 2, and the control circuit unit 3 is connected with the conductive touch panel via the touch detecting circuit unit 4, said power unit includes power interface circuit 81, safety switch 82, fuse 83, control switch 84, power circuit for control circuit 85 and paper-breaking functional switch 86, the control switch 84 is a relay switch, the safety switch 82 is a gate switch, said power interface circuit 81 is connected with the said motor driving circuit unit 2 via the safety switch 82, fuse 83, control switch 84 and paper-breaking functional switch 86, and said fuse 83 is connected with the said control circuit unit 3 via the power circuit for control circuit 85, among which, the touch detecting circuit unit 4 includes bio-voltage control switch circuit and ground switch circuit, the input control terminal of said bio-voltage control switch circuit is connected with said conductive touch panel, the output terminal of the control switch circuit is connected with the input control terminal of the said ground switch circuit, the output terminal of the ground switch circuit is connected with the input control terminal of said control circuit unit 3.

The bio-voltage control switch circuit is a switch transistor circuit. Refer to FIG. 3, according to the first embodiment of the present invention, the bio-voltage control switch circuit includes the first switch triode Q4, the base electrode of the first switch triode Q4 is connected with said conductive touch panel via the first resistor R5, and the base electrode is grounded via the second resistor R6 that paralleled with the first capacitor C7, and the collector of the first switch triode Q4 is connected with the power VCC, its emitter is grounded via the third resistor R16 that paralleled with the second capacitor C8, and the emitter is connected with the input terminal of the ground switch circuit.

The ground switch circuit is a switch transistor circuit, includes the second switch triode Q2, the base electrode of the second switch triode Q2 is connected with the output terminal of said bio-voltage control switch circuit, i.e. the emitter of the first switch triode Q4, the emitter of the second switch triode Q2 is grounded, and its collector is connected with the power via the fourth resistor R7, and the collector is connected with the input control terminal of said control circuit unit 3 via the optical coupler U1.

Refer to FIG. 4, according to the second embodiment of the present invention, the bio-voltage control switch circuit includes the first switch triode Q3, the base electrode of the first switch triode Q3 is connected with said conductive touch panel via the serial resistors R6 and R7, and the base electrode is grounded via the second resistor R8 that paralleled with the first capacitor C3 and diode D4, and the collector of the first switch triode Q3 is connected with the power VCC via the parallel power indication LED and touch indication LED3, its emitter is connected with the input control terminal of the ground switch circuit.

The ground switch circuit is a switch transistor circuit, includes the second switch triode Q2, the base electrode of the second switch triode Q2 is connected with the output terminal of said bio-voltage control switch circuit, i.e. the emitter of the first switch triode Q3, the emitter of the second switch triode Q2 is grounded, and its collector is connected with the input control terminal of said control circuit unit 3.

In the present invention, the control circuit unit 3 according to the paper-breaker touching safety protector is connected further with a paper-entry detecting circuit 5, in FIG. 3, said paper-entry detecting circuit unit 5 includes a LED IT1 and a light dependent diode IR1, the light-emission part of the said LED IT1 is correspondent with the light-sensitive part of the light dependent diode IR1, and are respectively located on the opposite side wall of the paper-entry passage of the paper-breaker.

The control circuit unit 3 according to the paper-breaker touching safety protector is connected further with an over-load protection circuit unit 6 and a motor reverse-run detecting circuit unit 7.

In application, one end of the motor driving circuit unit 2 is electrically connected with the said control circuit unit 3, the other end is electrically connected with the said paper-breaking machinery part 1 to drive the paper-breaker to work; one end of the said motor reverse-run detecting circuit unit 7 is electrically connected with the said control circuit unit 3, the other end is electrically connected with the said paper-breaking machinery part 1 to detect the reverse run signal and transmit the reverse run signal to the said control circuit unit 3, and make the control circuit unit 3 to control the paper-breaking machinery part 1's reverse run; one end of the paper-entry detecting circuit unit 5 is electrically connected with said control circuit unit 3, the other end is electrically connected with the said control circuit power to monitor the paper-entry signal, in case of the paper enters into the portal of the said paper-breaking machinery part 1, the said paper-entry detecting circuit unit 5 transmits the paper-entry signal to the said control circuit unit 3, after the control circuit unit 3 processing, said motor driving circuit unit 2 would be conductive and drive the paper-breaking machinery part 1 to work.

Figure 5:
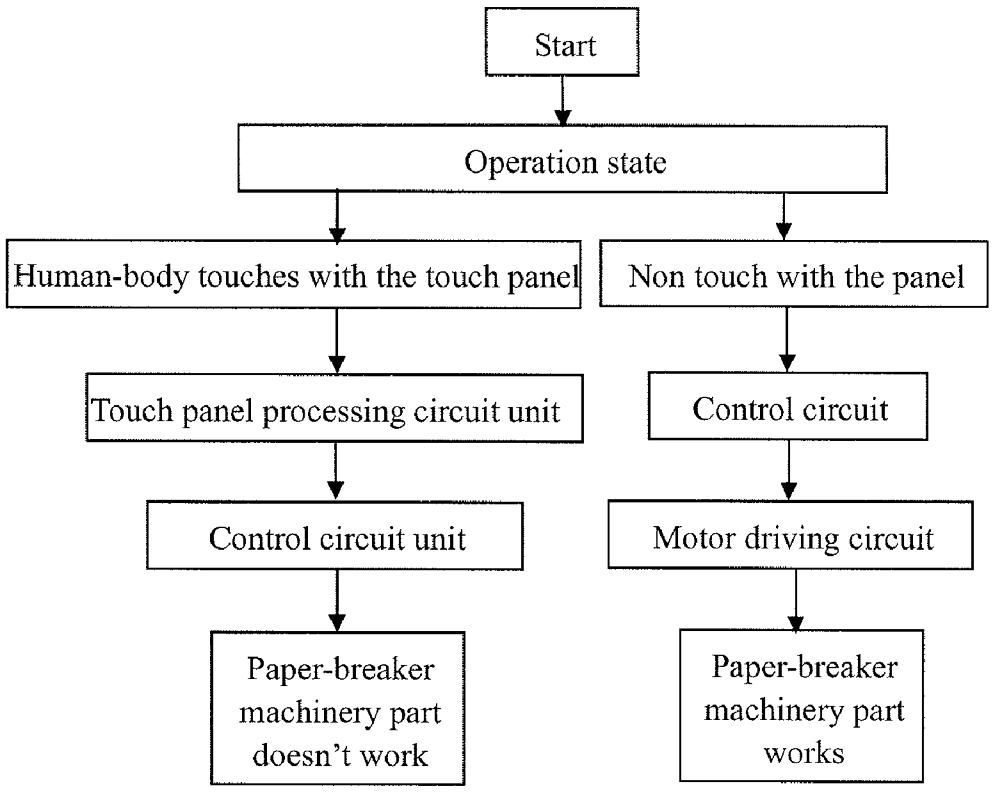
FIG. 5 is a flow chart showing a controlling of the paper-breaker touching safety protector according to the present invention.

Refer to FIG. 5, in paper-breaking operation, if some human-body happened to contact with the touch panel at the paper-entry port, after processed by the touch detecting circuit unit 4, the human-body signal is transmitted to the control circuit unit 3, the control circuit unit 3 would switch off the motor driving signal, the paper-breaker is stop to realize a human-body touch auto-stop function. If the human-body doesn't contact with the touch panel at the paper-entry port, the control circuit unit 3 would control the motor driving circuit unit 2 to effect a normal operation of the paper-breaking machinery part 1.

Refer to FIG. 3, according to the first embodiment of the present invention, the paper-breaker has the following functions:

- Over-load
- Light activated paper-breaking
- Paper breaking, close and reverse run function
- Human-body contact auto-stop.

The power circuit for the control circuit utilizes the resistor-capacitor to cut down the voltage, a 24V low voltage control circuit power is provided from the live wire of the electric supply power through the resistors R1, R2, capacitors C1, C2, diodes D5, D6 and constant-voltage diode ZD1. The potential difference between power positive pole and zero line of the control circuit is 24V, it is even more less than the human-body safe voltage and has no danger to human and animal. The power circuit processed by human-body touch panel is a bridge rectifying circuit, a 12V DC power is turned out from the constant & filter circuit. The circuit consists of diodes D1~D4, constant diodes ZD2, resistor R12 and capacitor C3.

The human-body contact metal part is connected with the base electrode of triode Q4 via a resistor (1MΩ), and make use of the human-body electro-static disturbance to drive the triodes Q2, Q4. The Q3 is off and stop the motor to realize the paper-breaker's human-body contact auto-stop function.

Refer to FIG. 4, according to the first embodiment of the present invention, the paper-breaker has the following functions:

•Switch LED indication

•Touch protection LED indication

•Over-load, over-load LED indication

•Power indication

•Light activated paper-breaking

•Paper breaking, close and reverse run function.

If remove the resistors R18, R14, R13, R11, R12, LED1, LED2, diodes D10, D9, D6, constant diode ZD2, capacitor C5 and silicon controlled rectifier SCR, the apparatus would have no over-load and switch LED indication functions, and the circuit could be applied to the middle class apparatus.

If remove the resistors R18, R14, R13, R11, R12, R16, R17, LED 1, LED 2, LED 3, diodes D10, D9, D6, D12, D13, constant diode ZD2, capacitor C5, silicon controlled rectifier SCR and triode Q4, the apparatus would have no functions of over-load, overload indication, power indication and switch indication, the circuit could be applied to the lower class apparatus.

The power circuit for the control circuit utilizes the resistor-capacitor to cut down the voltage, a 24V low voltage power circuit is provided from the line wire of the electric supply power through the resistors R1, R2, capacitors C1, C2, diodes D1, D2 and constant-voltage diode ZD1. The potential difference between power positive pole and zero line of the control circuit is 24V, it is even more less than the human-body safe voltage and has no danger to human and animal. The human-body contact metal part is connected with the base electrode of triode Q3 via two resistors R6 and R7, and make use of the human-body electro-static disturbance to drive the triode Q2, Q3. The Q1 is off and stop the motor to realize the protection function.

A bridge rectifying circuit may be applied to provide power to the touching circuit, and an optical coupler may be used to isolate the motor control circuit, and thus realize a more stable apparatus operation.

The touch auto-stop principle is as follows:

(1) In case of the apparatus is in the state of paper-breaking or reverse run, if the human-body touches with the panel metal part, the resistors R7, R6, R8, diode D4, capacitor C3 would form a triode base electrode power supply circuit, the triode Q3 would conductive, and the triode Q2 would be conductive on the basis of the base electrode voltage. When the triode Q2 is conductive, its collector voltage would be lower, the touch indicating light and resistor R5 would constitute a loop, and the touch indicating light would be on. The base electrode voltage of Q5 would be lower on the basis of the diode D16 conduction, if the apparatus is in reverse run state, the triode Q5 would be cut-off on the basis of the lower base electrode voltage and the apparatus would stop. If the apparatus is in the paper-breaking state, the base electrode voltage of the triode Q1 would be lower on the basis of the diode D15 conduction, the triode Q1 would be cut-off, the relay would be switched off, and the apparatus would stop to effect a safety protection.

(2) The apparatus is stopped by human-body touching, when human-body is separated from the apparatus, the triode Q3 would be cut-off because of no base electrode conductive voltage and the apparatus would resume a normal operation.

The operation principle of the power indication circuit is as follows:

The power indicating light, resistors R17, R16 and triode Q4 constitute a basic power indicating light circuit, if the functional switch is in the stop state, the power indicating light is off because of the emitter of triode Q4 has not conductive circuit. If the functional switch is in reverse run position, the emitter of triode Q4, diode D12 and functional switch constitute a conductive circuit, and the power indicating light would be on. If the functional switch is in the paper-breaking state, the emitter of triode Q4, diode D13 and functional switch constitute a conductive circuit, and the power indicating light would be on.

In view of the paper-breaker touching safety protector according to the present invention, owing to the fact that the serial bio-voltage control switch circuit and ground switch circuit are to be applied, the input control terminal of the bio-voltage control switch circuit is connected with the conductive touch panel at the paper-entry port of the paper-breaker, the output terminal of the control switch circuit is connected with the input control terminal of the said ground switch circuit, the output terminal of the ground switch circuit is connected with the input control terminal of the said control circuit unit 3, in case of human-body contacts with the conductive touch panel, both the bio-voltage control switch circuit and ground switch circuit are conductive by the human-body bio-current to stop the control circuit unit 3 to work, even though the power switch is turned on, the paper-breaking machinery part 1 wouldn't work, and thus could effect a protective rule from the accident harm to human body and realize a real-time safe monitor; the whole controlling is safe and sensitive with a simple circuit structure and reliable operation performance, it functions a convenient manipulation and wide usability with the safety.

While the present invention has been particularly shown and described with references to preferred embodiments thereof, it will be understood by those skilled in the art that various changes in form and details may be made therein without departing from the spirit and scope of the invention as defined by the claims. It is clearly understood therefore that the same is by way of illustration and examples only and is not to be taken by way of limitation.

I claim:

1. A paper-breaker touching safety protector, including the paper-breaking machinery part, functional circuit and conductive touch panel located at the paper-entry port of the paper-breaker, said functional circuit includes the power unit, motor driving circuit unit, control circuit unit and touch detecting circuit unit, said control circuit unit is connected with the paper-breaking machinery part via the motor driving circuit unit, and the control circuit unit is connected with the conductive touch panel via the touch detecting circuit unit, said power unit is connected respectively with the said control circuit unit and motor driving circuit unit, characterized in that said touch detecting circuit unit includes a bio-voltage control switch circuit and a ground switch circuit, the input control terminal of said bio-voltage control switch circuit is connected with said conductive touch panel, said ground switch circuit is a switch transistor circuit, said ground switch circuit includes a first switch triode, the base electrode of the first switch triode is connected with the output terminal of said bio-voltage control switch circuit, the emitter of the first switch triode is grounded, and its collector is connected with the power via a first resistor, and the collector is connected with the input control terminal of said control circuit unit via an optical coupler.

2. The paper-breaker touching safety protector according to claim 1, characterized in that said bio-voltage control switch circuit is a switch transistor circuit.

3. The paper-breaker touching safety protector according to claim 2, characterized in that said bio-voltage control switch circuit includes a second switch triode, the base electrode of the second switch triode is connected with said conductive touch panel via a second resistor, and the base electrode is grounded via a third resistor that paralleled with a first capacitor, the collector of the second switch triode is connected with the power, its emitter is grounded via a fourth resistor that paralleled with a second capacitor, and the emitter is connected with the input control terminal of the ground switch circuit.

4. The paper-breaker touching safety protector according to claim 3, characterized in that the collector of said second switch triode is connected with the power via the paralleled power indication LED and the touch indication LED.

5. The paper-breaker touching safety protector according to one of claims 1-4, characterized in that said control circuit unit is connected further with a paper-entry detecting circuit unit, said paper-entry detecting circuit unit includes a LED and a light dependent diode, the light-emission part of the said LED is correspondent with the light-sensitive part of the light dependent diode, and are respectively located on the opposite side wall of the paper-entry passage of the paper-breaker.

6. The paper-breaker touching safety protector according to one of claims 1-4, characterized in that control circuit unit is connected further with an over-load protection circuit unit, said over-load protection circuit unit includes a sampling resistor (R14), a constant-voltage diode (ZD2), a third capacitor (C5) and a thyristor (SCR), said thyristor (SCR) is connected between the input control terminal of said control circuit unit and the ground, said constant-voltage diode (ZD2) and the third capacitor (C5) is connected between the electric current output terminal of said motor driving circuit unit and the ground in series, said sampling resistor (R14) is also connected between the electric current output terminal of said motor driving circuit unit and the ground, the trigger electrode of said thyristor (SCR) is connected between said constant-voltage diode (ZD2) and the third capacitor (C5).

7. The paper-breaker touching safety protector according to one of claim 1-4, characterized in that said control unit is connected further with a motor reverse-run detecting circuit unit.

8. The paper-breaker touching safety protector according to one of claims 1-4, characterized in that said power unit includes the power interface circuit, safety switch, fuse, control switch, power circuit for control circuit and paper-breaking functional switch, said power interface circuit is connected with said motor driving circuit unit via respectively the safety switch, fuse, control switch and paper-breaking functional switch, said fuse is connected with said control circuit unit via the power circuit for control circuit.

9. The paper-breaker touching safety protector according to claim 6, characterized in that a diode (D9) is connected between the electric current output terminal of said motor driving circuit unit and said constant-voltage diode (ZD2).

10. The paper-breaker touching safety protector according to claim 9, characterized in that a fifth resistor (R13) is connected between said diode (D9) and said constant-voltage diode (ZD2).

11. The paper-breaker touching safety protector according to claim 9, characterized in that a fifth resistor (R13) is connected between the third capacitor (C5) and said constant-voltage diode (ZD2).

12. The paper-breaker touching safety protector according to claim 6, characterized in that a sixth resistor (R11) is connected between the trigger electrode of said thyristor (SCR) and the ground.

13. The paper-breaker touching safety protector according to claim 8, characterized in that said control switch is a relay switch.

* * * * *